Jan. 4, 1949.   H. E. CROZIER ET AL   2,458,256
WATER CARBURETOR
Filed May 14, 1946                            2 Sheets-Sheet 1
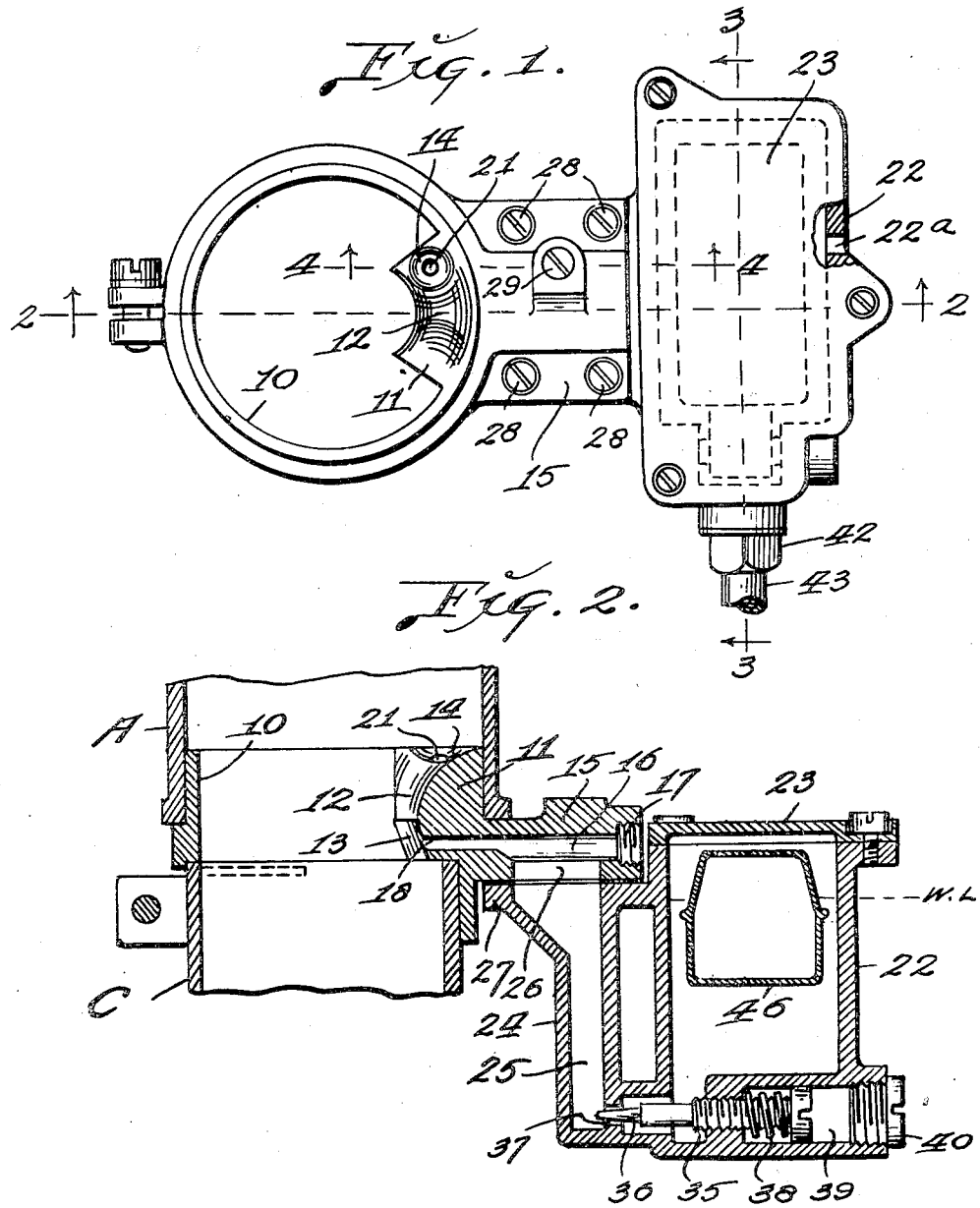
INVENTOR.
HAROLD E. CROZIER AND
ALBERT G. H. VANDERPOEL.
BY Martin P. Smith, ATTY.

Jan. 4, 1949. H. E. CROZIER ET AL 2,458,256
WATER CARBURETOR
Filed May 14, 1946 2 Sheets-Sheet 2
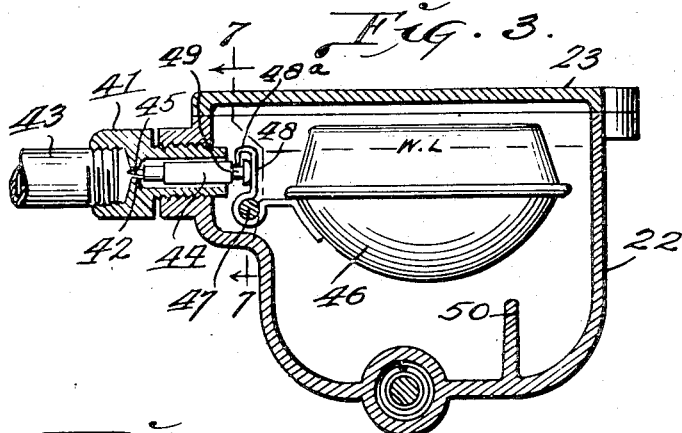
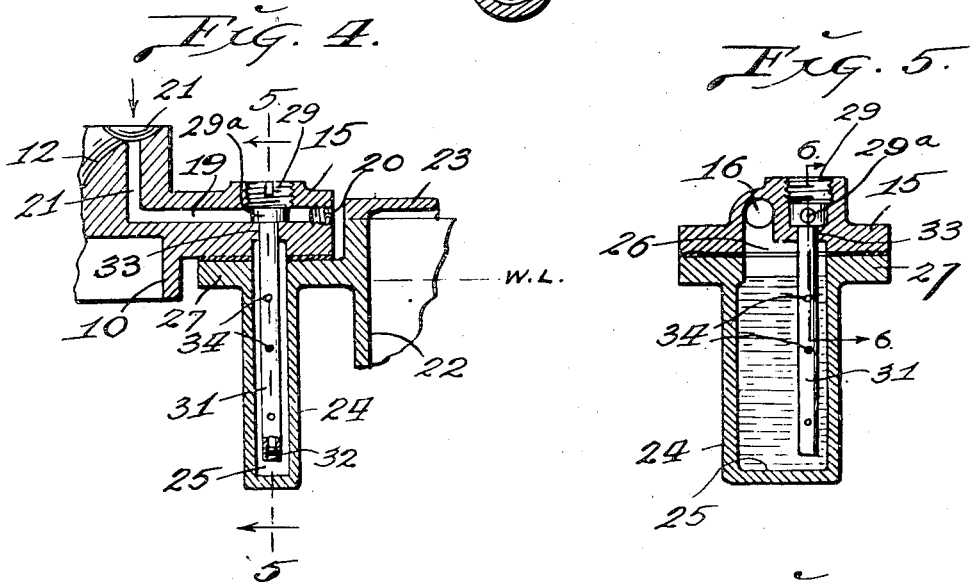
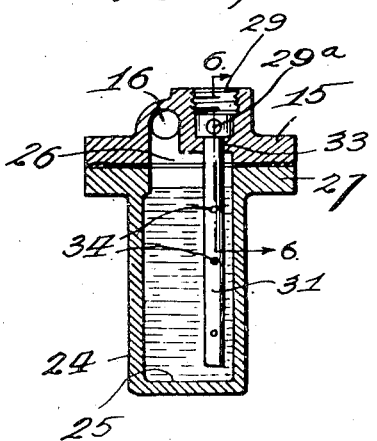
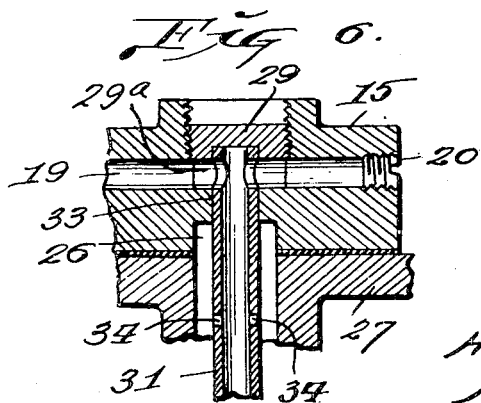
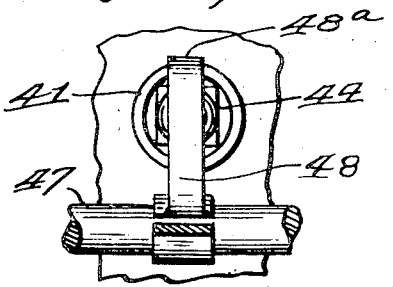
INVENTORS.
HAROLD E. CROZIER AND
ALBERT G. H. VANDERPOEL
BY Martin P. Smith ATTY.

Patented Jan. 4, 1949

2,458,256

UNITED STATES PATENT OFFICE 2,458,256

WATER CARBURETOR

Harold E. Crozier and Albert G. H. Vanderpoel, Los Angeles, Calif.

Application May 14, 1946, Serial No. 669,515

5 Claims. (Cl. 261—18)

Our invention relates to a water carburetor and has for its principal object, to provide simple, inexpensive and highly efficient means, whereby a regulated and controlled amount of water is inducted into air horn of a gasoline carburetor to mix with the air stream passing to said carburetor and from the latter, into the combustion chambers of an internal combustion engine. Particularly the invention relates to an improved device for introducing water into the carburetor intake air stream at rates in accordance with the quantities or rates of the air flow, for the several purposes of increasing the volumetric efficiency of the engine, suppressing detonation, decreasing fuel consumption, and increasing the power output and general performance efficiency of the engine.

Our major object is to accomplish these purposes by a novel assembly comprising a tubular or ring-like member insertible between the carburetor and air filter and containing a water induction nozzle of Venturi characteristics, and a directly connected body containing a float controlled water supply chamber from which water is delivered to the nozzle in accordance with the rate of air flow to the carburetor.

Particularly contemplated is the provision of means whereby air is mixed with water passing to the nozzle, and specifically in a manner whereby the induction of air by the nozzle-created suction elevates the water from a normal level below the nozzle position.

A further object of our invention is, to provide a simple, practical and highly efficient high speed bleeder, which acts positively and automatically to produce a water-air mixture which, when combined with the main fuel and air mixture forms an ideal fuel for internal combustion engines.

Our present application is an improvement on our copending application on Anti-knock or detonation dampening device, filed March 20, 1944, Ser. No. 527,252, now Patent No. 2,407,478.

With the foregoing and other objects in view, our invention consists in certain novel features of construction and arrangement of parts which will be hereinafter more fully described and claimed and illustrated in the accompanying drawings, in which:

Fig. 1 is a plan view of our improved water carburetor.

Fig. 2 is a vertical section taken on the line 2—2 of Fig. 1 and showing parts of the air cleaner and carburetor with which our device is combined.

Fig. 3 is a vertical section taken on the line 3—3 of Fig. 1.

Fig. 4 is a vertical section taken on the line 4—4 of Fig. 1.

Fig. 5 is a vertical section taken on the line 5—5 of Fig. 4.

Fig. 6 is an enlarged section taken on the line 6—6 of Fig. 5.

Fig. 7 is an enlarged section taken on the line 7—7 of Fig. 3.

Referring by numerals to the accompanying drawings which illustrate a preferred embodiment of our invention, 10 designates a ring having a lower portion suitably clamped on the inlet end of a conventional carburetor horn C and with its upper portion disposed within the lower end portion of the air cleaner outlet A.

Formed integral with the upper portion of ring 10, on the inner face thereof is a lug or internal projection 11, arcuate in length to conform to the wall of said ring and which lug functions as a nozzle for the induction of water into the carburetor air intake stream and in accordance with its rate of flow.

From the upper rear edge of this lug, its upper or exposed face curves inwardly toward the center of the ring and downwardly to a horizontal plane a short distance above the bottom of said lug, thus forming a short vertically disposed duct or channel 12 that is arcuate in horizontal section and convex in vertical section to present an air-contacted surface having in cross-section as viewed in Fig. 2, a Venturi section shape.

From the horizontally disposed lower edge of this duct, the front face of the lug is undercut to form a horizontally arcuate vertically inclined face 13.

Formed in one end of the curved face 12 of nozzle 11, at the top thereof, is a shallow depression 14.

Formed integral with ring 10 directly opposite the nozzle 11 is an external projection or lug 15, in which is formed a centrally disposed horizontal duct 16 closed at its outer end by a plug 17 and its inner end, which is slightly smaller than its outer portion, terminates in a jet aperture 18 on the lower portion of undercut face 13 just below the lower end of the channel 12.

Formed in lug 15, parallel with duct 16 is a duct 19, the rear end of which is closed by a plug 20 and the forward portion of this duct extends upwardly in nozzle 11 and terminates in an air inlet aperture 21 in the center of the depression 14.

A substantially rectangular housing 22 having a removable cover 23, provides a water supply chamber and integral with one side of said housing is a vertically disposed housing 24 having a water well 25, the upper end thereof communicating through an aperture 26, with the rear portion of duct 16.

Formed in the upper portion of one of side walls of housing 22 is a breather aperture 22a. Formed integral with the upper end of housing 24 is a flange 27, upon which rests lug 15, and the parts being secured to each other by screws or bolts 28.

Screw seated in lug 15 along side duct 16, is a screw plug 29 having a diametrically disposed aperture 29a that registers with duct 19, and depending from said screw plug is a small tube 31 that depends into well 25 and its lower end being closed by a plug 32.

The upper end portion of tube 31 fits snugly in an aperture 33 formed in lug 15 below plug 29 and formed through the wall of said tube throughout its length are several small air jet apertures 34.

The upper one of these apertures is disposed below the normal water level prevailing in the chamber within housing 22, which water level is indicated by dotted line WL in Figs. 2, 3 and 4 and ring 10 and housing 22 are relatively disposed so that ducts 16 and 19 are above said normal water level. Perforated tube 31 in operation, provides a high speed bleeder for automatically delivering water spray to the air stream as it passes from the air filter to the carburetor.

Means for controlling a metered flow of water from the chamber within housing 22 into the lower portion of well 25, comprises a screw 35 seated in the lower portion of housing 22 and provided with a tapered end portion 36, which enters a port 37, communicating with the lower end of well 25 and arranged between the head of said screw and the wall in which the screw is seated is an expansive coil spring 38.

The outer end of the chamber 39 occupied by screw 35, is closed by a screw plug 40, thus preventing leakage of any water that might seep from the chamber in housing 22, past the threaded portion of said screw.

Located in one end of housing 22 is a tubular fitting 41 having a seat 42 for a needle valve and connected to the outer end of said fitting is a water supply duct 43 which may lead from the radiator hose or from a small tank conveniently located beneath the engine hood.

Arranged for sliding movement in fitting 41, is a plunger 44, non-circular in cross section, and the outer end of said plunger terminates in a needle valve 45, which cooperates with seat 42 in controlling the flow of water from duct 43 into the chamber within housing 22.

A conventional float 46 is pivoted at 47 beneath fitting 41, and extending upward from said pivot is a narrow finger 48 that bears against the outer end of plunger 44 and the upper end of this finger is bent downward to form a hook 48a that engages in a groove 49 formed in the rear portion of plunger 44 (see Fig. 3).

Projecting upward from the bottom of housing 22, is a web 50, which serves as a stop to limit the downward movement of float 46.

When the motor, with which our water carburetor is associated, is at idle speed no water is taken into the air stream and likewise while going down grades in gear, no water is taken in.

The device injects water only when the motor picks up the load under partial and full throttle, or only when driving conditions create a vacuum in the air horn of the gasoline carburetor above the butterfly thereof.

Under normal conditions with float elevated, finger 48 bears against the outer end of plunger 44 and holds needle 45 against its seat 42 and when water is withdrawn from the float chamber, and the float lowers, the pressure of finger 48 against plunger 44 is relieved and hook 48a in groove 49 acts on plunger to withdraw the needle valve 45 from its seat, thus permitting water to enter the float chamber from duct 43.

Screw 35 is adjusted so as to control and regulate a metered flow of water from the float chamber into wall 25. Suction produced as a result of acceleration of motor speeds and increased rates of air flow along the nozzle surfaces 12 and 13 draws water through duct 16 from the top of well 25, which water discharges from the jet aperture to be picked up and mixed with the air passing to the gasoline carburetor.

With particular reference to the displacement of water from the well 25 into passage 16, it will be noted, see Fig. 5, that the normal water level in the well and tube 31 is above the uppermost aperture 34, and consequently that no air flow through the aperture into the well occurs until the suction communicated from passage 16 lowers the water in the tube to the aperture depth. Thereupon the air stream entering the well beneath the water level agitates and entrains the water to a degree causing it to be carried by the air stream into passage 16 for admixture with the air taken into the carburetor. And of course, lowering pressures communicated from passage 16 produces increasing air flow into the well and increasing displacement of water therefrom. As water is so displaced from the well and the water level therein drops, openings 34 progressively admit air into the well, but individually with decreasing air passage since each upper opening 34 uncovered by a drop of the outside water level acts as an air bleeder with relation to the apertures below.

Thus the air taken into the gasoline carburetor is heavily laden with moisture and the resultant vaporized mixture of air, water and gasoline provides an ideal gaseous fuel for the development of increased power, cooler engine temperatures, elimination of preignition and detonation, also, the superheated steam action in the dissolving of the carbon holding gums resulting from use of hydrocarbon fuels in engines.

Among the particularly novel and advantageous features of our invention are, the nozzle 11 and the high speed bleeder 31, which are arranged and constructed so as to act automatically in response to engine speeds and loads to provide an air water mixture and deliver same directly into the air stream from the air filter to the gasoline carburetor.

It will be understood that minor changes in the size, form and construction of the various parts of our improved carburetor may be made and substituted for those herein shown and described without departing from the spirit of the invention, the scope of which is set forth in the appended claims.

We claim as our invention:

1. A device for humidifying an air stream to be taken by an engine, comprising a tubular member forming a substantial cylindrical air passage and having in vertical axial position a bottom portion for attachment to the inlet end of a carburetor, said member having an internal projection extending within said passage from one side only thereof and leaving the major portion of the passage unobstructed, and an external projection directly adjacent said internal projection, there being in said projections a water passage extending into said member and said internal projection having a substantially Venturi-shaped surface extending axially and inwardly of the member so that the air flow along said surface induces water flow through said water passage into the member in accordance with the rate of air flow therethrough, and a water supply float chamber detachably secured to the underside of said external projection, said chamber containing beneath said external projection a riser passage through which water is taken upwardly into said water passage.

2. A device for humidifying an air stream to be taken by an engine, comprising a tubular member forming a substantially cylindrical air passage and having in vertical axial position a bottom portion for attachment to the inlet end of a carburetor, said member having an internal projection extending within said passage from one side only thereof and leaving the major portion of the passage unobstructed, and an external projection directly adjacent said internal projection, there being in said projections a water passage extending into said member and said internal projection having a substantially Venturi-shaped surface extending axially and inwardly of the member so that the air flow along said surface induces water flow through said water passage into the member in accordance with the rate of air flow therethrough, a water supply float chamber, detachably secured to the underside of said external projection, said chamber containing beneath said external projection a riser passage through which water is taken upwardly into said water passage, an air delivery tube carried by and depending from said external projection within said riser passage, and means for supplying air to said tube.

3. A device for humidifying an air stream to be taken by an engine, comprising a tubular member forming a substantially cylindrical air passage and having in vertical axial position a bottom portion for attachment to the inlet end of a carburetor, said member having a thickened wall portion forming an internal projection extending within the passage and leaving the major portion of the passage unobstructed, said projection having an inner surface of substantially Venturi section shape and the lower portion of the member below said projection being of split formation to clamp about the carburetor, said member having adjacent said internal projection an external projection, said projections containing a water passage through which water is induced into the air stream flowing along said curved surface, and a float chamber detachably secured to said external projection and containing a water riser passage communicating with the first mentioned water passage.

4. A device for humidifying an air stream to be taken by an engine, comprising a tubular member forming a substantially cylindrical air passage and having in vertical axial position a bottom portion for attachment to the inlet end of a carburetor, said member having an internal projection extending within said passage from one side only thereof and leaving the major portion of the passage unobstructed, and an external projection directly adjacent said internal projection, there being in said projections a water passage extending into said member and said internal projection having a substantially Venturi-shaped surface extending axially and inwardly of the member so that the air flow along said surface induces water flow through said water passage into the member in accordance with the rate of air flow therethrough, and a water supply float chamber detachably secured to the underside of said external projection, said chamber containing beneath said external projection a riser passage through which water is taken upwardly into said water passage, and means for admitting air through a passage in said external projection for admixture with the water flowing through said water passage.

5. A device for humidifying an air stream to be taken by an engine, comprising a tubular member forming a substantially cylindrical air passage and having in vertical axial position a bottom portion applicable to the intake of an engine carburetor, said member having an internal projection extending within said passage from one side only thereof and leaving the major portion of the passage unobstructed, and an external projection directly opposite said internal projection, there being in said projections a first water passage extending into said member and said internal projection having a substantially Venturi-shaped surface extending axially and inwardly of the member so that the air flow along said surface induces water flow through said water passage into the member in accordance with the rate of air flow therethrough, a body detachably connected to said external projection and containing a water supply float chamber in which water stands at a normal level below said passage, means forming a second water passage taking water from said chamber and extending upwardly to communicate with said first water passage so that water is elevated from said second passage into the first water passage by the suction communicated therethrough, and means for admitting air to said second water passage to aid the elevation of water to the first water passage and to aerate the water being taken through said first water passage to the air stream flowing through said member.

HAROLD E. CROZIER.
ALBERT G. H. VANDERPOEL.

REFERENCES CITED

The following references are of record in the file of this patent:

UNITED STATES PATENTS

| Number | Name | Date |
| --- | --- | --- |
| 1,727,197 | Bryan et al. | Sept. 3, 1929 |
| 1,972,686 | Lorenzen | Sept. 4, 1934 |
| 2,040,020 | Parker | May 5, 1936 |
| 2,108,556 | Hardt | Feb. 15, 1938 |
| 2,441,301 | Waag et al. | May 11, 1948 |

FOREIGN PATENTS

| Number | Country | Date |
| --- | --- | --- |
| 384,689 | Great Britain | Dec. 15, 1932 |
| 465,474 | Great Britain | May 6, 1937 |